April 2, 1963 L. MOODY ETAL 3,083,986
BOAT TRAILER
Filed Oct. 10, 1960 3 Sheets-Sheet 1
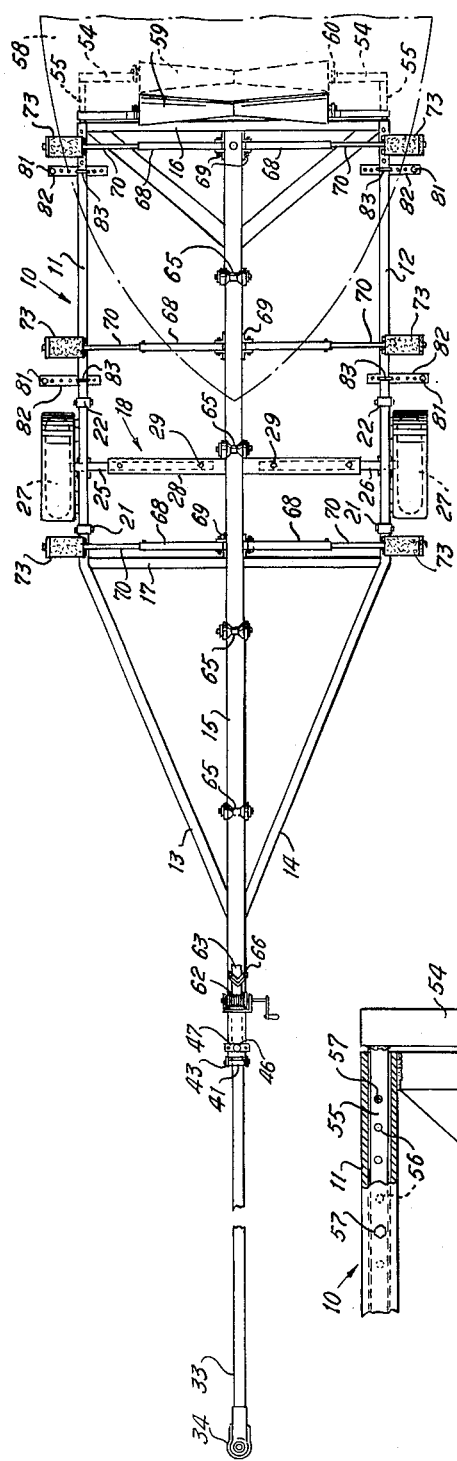
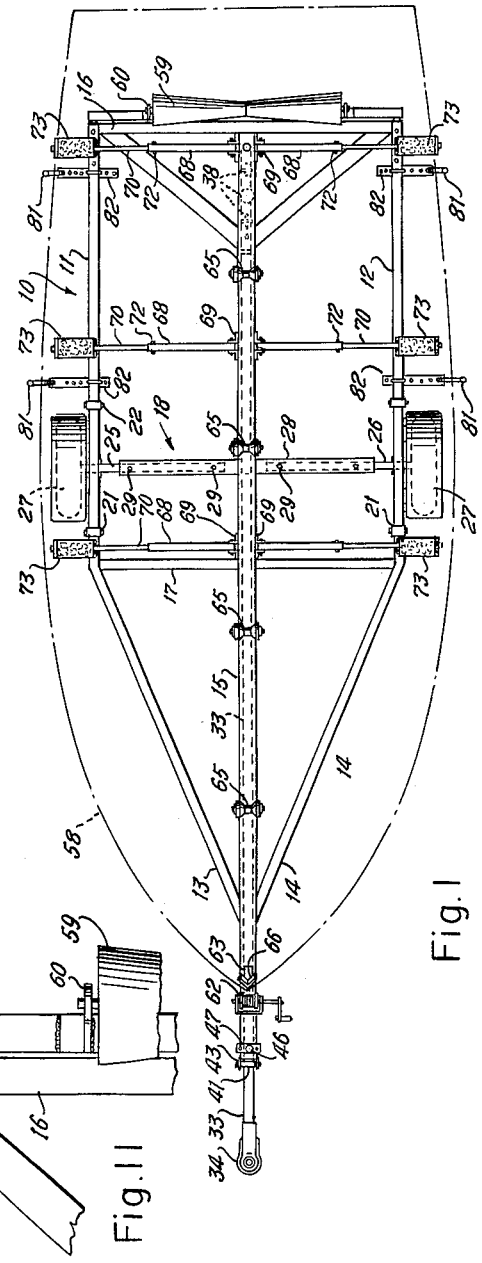
INVENTORS
Lamar Moody
Robert R. McClure
BY
ATTORNEY

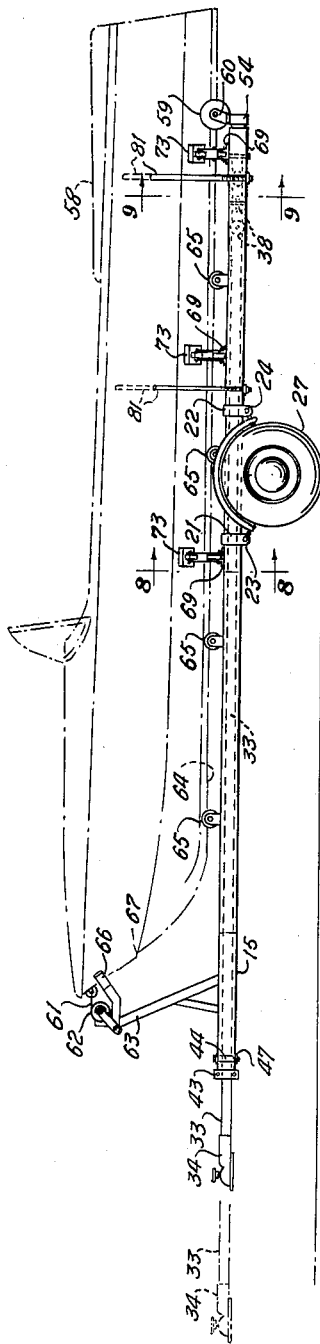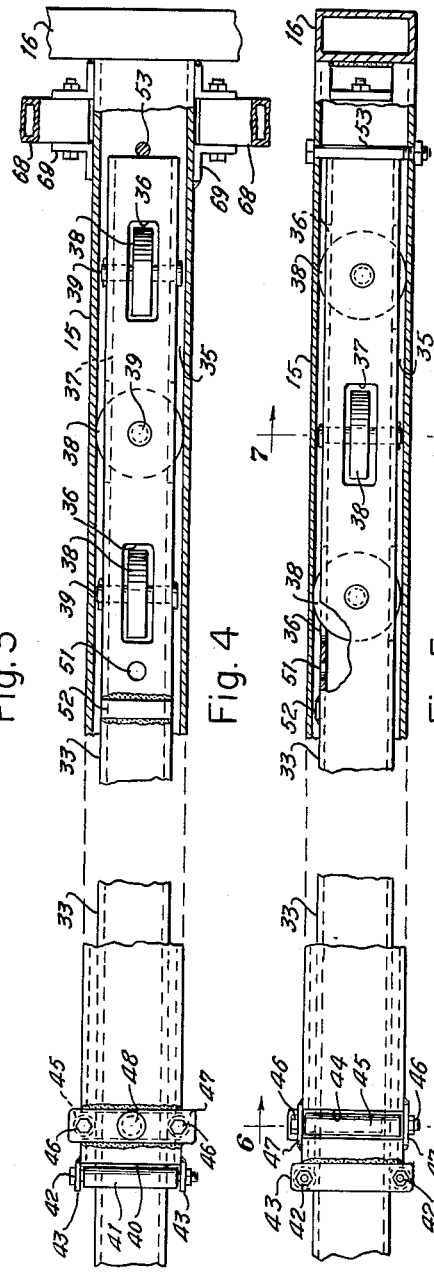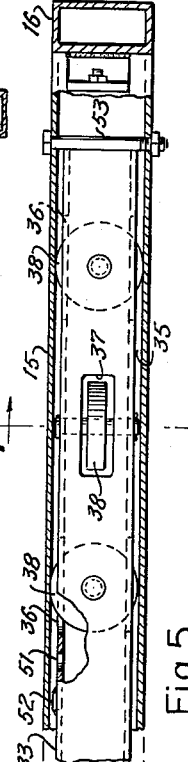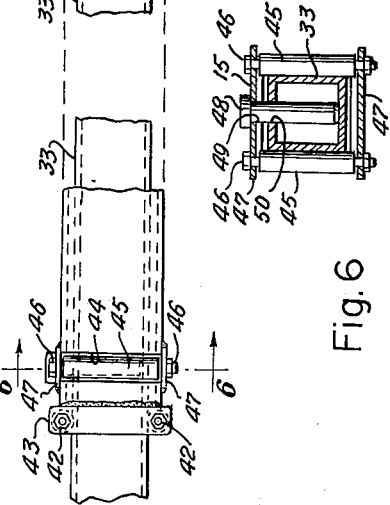
INVENTORS
Lamar Moody
Robert R. McClure
ATTORNEY April 2, 1963  L. MOODY ETAL  3,083,986
BOAT TRAILER
Filed Oct. 10, 1960  3 Sheets-Sheet 3

INVENTORS
Lamar Moody
Robert R. McClure

BY

ATTORNEY 3,083,986
BOAT TRAILER
Lamar Moody, 216 E. Jefferson, and Robert R. McClure, 1405 S. Fitzhugh, both of Dallas, Tex.
Filed Oct. 10, 1960, Ser. No. 61,563
3 Claims. (Cl. 280—414)

This invention relates to trailers adapted to be drawn by passenger vehicles, and it has particular reference to boat trailers by which light water craft can be transported, and the principal object of the invention resides in the provision of a trailer embodying features of design and construction enabling the same to be adjustably modified both longitudinally and laterally to expedite the handling and launching of boats of different lengths, widths and weights.

An object of the invention is that of providing a trailer which has a frame structure capable of being telescopically extended and contracted lengthwise, and embodying a towing member capable of being extended, while yet attached to the towing vehicle, to simplify the launching or loading a boat without hazarding moving the towing vehicle too close to the water's edge, as in marshy and unstable ground surfaces which often occur along inland lakes and streams where substantial numbers of light water craft are generally used.

Another and important object of the invention resides in the provision of a trailer in which the frame structure is formed of light but strong materials, and simple in design, thus affording an economical device which can be made available to the consumer at a relatively low cost.

A still further object of the invention is that of providing a trailer by which boats can be either launched therefrom or loaded thereon by a single individual with a minimum of effort and skill, and adjustments as to length and width of wheel base can be accompilshed with simplicity and with a minimum of time and effort.

It is an object of the invention to provide a boat trailer of the character described which embodies features of design and structure adapting the same to be packaged unassembled to be assembled by the purchaser, if desired.

Broadly, the invention contemplates the provision of a trailer for all types of light craft, having either inboard or outboard motors, and by which such craft can be handled and transported with ease and safety, both in highway traffic and to the individual using the same, and by which the boat can be launched from the trailer without disconnecting the same from the towing vehicle.

While the foregoing objects are paramount other and lesser objects will become apparent as the description proceeds, taken in connection with the appended drawings wherein:

FIGURE 1 is a plan view of a boat trailer embodying the invention, showing the longitudinally extensible tongue, frame and axle, the outline of a boat thereon being shown in dotted lines.

FIGURE 2 is another plan view of the invention showing the tongue extended, and fragmentarily illustrating, in broken lines, a boat partially loaded on the trailer.

FIGURE 3 is a side elevational view of a trailer embodying the invention showing the tongue, in broken lines, partially extended.

FIGURE 4 is a fragmentary plan view of the extensible tongue, shown partially in section, illustrating the telescoping members and the systems of rollers therein.

FIGURE 5 is a fragmentary side view of the tongue assembly, shown partially in section, illustrating the roller system between the telescoping members.

FIGURE 6 is a transverse sectional view of the extensible tongue, on lines 6—6 of FIGURE 5, showing an arrangement of end rollers and a locking pin.

FIGURE 7 is a transverse sectional view of the tongue, on lines 7—7 of FIGURE 5, showing the discular rollers in the internal telescoping member.

Figure 8:
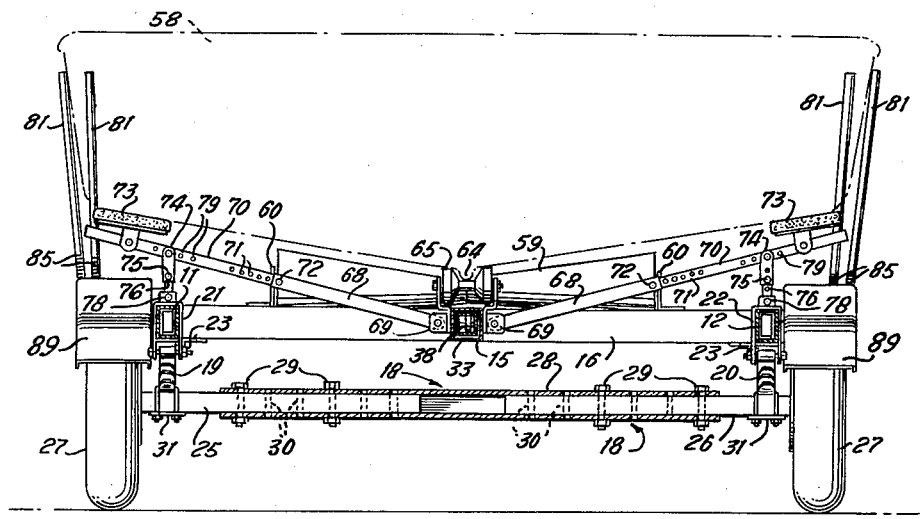
FIGURE 8 is a transverse sectional view of the trailer frame, on lines 8—8 of FIGURE 3, showing the extensible axle, the boat supporting arms, and the flexible guide rods on each side.

A prime object of the invention is that of providing a boat trailer which is flexible as to its adaptability to the carrying of loads of different weights and bulk which are characteristic of the different manufacturers and types of light water craft. The types of boats generally used in inland streams and lakes, and transported by trailer, are usually of light construction but considerable additional weight results from the inclusion of either inboard or outboard motors, the former being usually of the heavier type, and boats having inboard motors generally have a wider beam requiring greater lateral support.

The invention primarily comprises a frame generally designated by the numeral 10 which has parallel side members 11 and 12 and forward converging members 13 and 14 whose forward ends are welded or otherwise secured to each side of a rigid tongue member 15 which extends through the frame 10 intermediate the side members 11 and 12 and is secured at its rearmost end to a cross bar 16 rigidly connecting the side members at the rear of the frame 10, as apparent in FIGURES 1 and 2. A cross bar 17 extends between the side members 11 and 12 at the juncture therewith of the converging forward members 13 and 14 of the frame 10.

The frame 10 is supported forwardly of its rectangular portion by an extensible axle 18, a pair of leaf type springs 19 and 20 being attached thereto at each side of the frame 10 by adjustable clamps 21 and 22, and connected at their ends by shackles and brackets 23 and 24, as shown in FIGURES 1, 2, 3 and 8, to the frame members 11 and 12.

The axle 18 comprises a pair of right and left rectangular members 25 and 26, on which the wheels 27 are mounted, and these elements are connected in axial alignment by a hollow sleeve 28, which is rectangular in transverse section, and secured by bolts 29 arranged through the sleeve 28 and holes 30 spaced along each of the axle members 25 and 26, as shown in dotted lines in FIGURE 8. With this arrangement the axle 18 can be extended and contracted to provide variations in the width of the wheel base. The clamps 31 and 32 by which the springs 19 and 20 are secured to the axle members 25 and 26 can be loosened whereby the latter can be moved inwardly and outwardly with respect to the springs 19 and 20.

The tongue member 15 is rectangular in transverse section and hollow, as shown in FIGURES 4, 5, 6, 7, 8 and 9, and has an extensible element 33 telescopically associated therewith and which is of lesser transverse dimension than the tongue 15 so that the member 33 can be extended in the manner illustrated in FIGURES 2 and 3, adapting the trailer to be moved rearwardly substantially the length of the trailer frame 10 while the member 33 is attached to the trailer hitch (not shown) of the towing vehicle. A conventional hitch socket 34 is shown attached to the forward end of the extensible member 33 in FIGURES 1, 2 and 3.

The telescoping association between the tongue 15 and extensible member 33 is illustrated in detail in FIGURES 4, 5, 6, 7, 8 and 9. The extensible member 33 has a dimension which provides a liberal space 35 surrounding the same within the tongue 15, as best shown in FIGURES 4, 5 and 7, and has two pairs of aligned elongated slots 36 in its opposing top and bottom sides near its rearmost end, as shown in FIGURES 4 and 5, and elongated slots 37 formed in each opposing vertical side intermediate the pairs of slots 36. The paired slots 36 and 37 are spaced apart and each has a discular roller 38 pivotally supported therein on a pin 39 arranged transversely through the member 33, each roller 38 having a diameter slightly less than the internal vertical or lateral dimension of the tongue 15.

The forward end of the tongue 15 is cut back on its top and bottom sides defining recesses 40 in which are arranged cylindrical type rollers 41 which are pivoted on bolts 42 whose ends extend through the ends of straps 43 welded across the sides of the tongue 15 and extend over the ends of the recesses 40, as shown in FIGURES 4, 5 and 6. Spaced rearwardly from the recesses 40, but in transverse relation thereto, are slots 44 which are formed transversely of the sides of the tongue 15, and cylindrical rollers 45 are arranged in the slots 44 pivoted on bolts 46 extending through the ends of straps 47 welded across the opposing top and bottom sides of the tongue 15, as shown in FIGURES 4, 5 and 6.

It therefore becomes apparent that, by the arrangement of rollers described above, the extensible member 33 can be telescopically moved within the tongue 15 with a minimum of friction while being maintained in accurate alignment therewith and providing a rigid connection between the two members when completely extended, as depicted in FIGURE 2. The members 15 and 33 are secured together in contracted or extended positions by a pin 48, which is inserted through apertures 49 in the top of the tongue 15 and one of the apertures 50 or 51 in the top of the member 33.

When the member 33 is extended, as in FIGURE 2, the pin 48 is arranged through the apertures 51 therein, which is located near the inner end thereof, as shown in FIGURES 4 and 5, but reposes in the aperture 50, near its forward end, when the member 33 is contracted into the tongue 15, in the manner illustrated in FIGURES 4, 5 and 6. The longitudinal movement of the member 33 with respect to the tongue 15 is limited in extended position by a stop member 52 arranged transversely of the top of the member 33 forwardly of the assembly of rollers near the rearmost end thereof, as shown in FIGURES 4 and 5. The stop member 52 engages the upper roller 45 to prevent the member 33 from being withdrawn from the tongue 15. In its contracted position the member 33 is limited by a pin or bolt 53 arranged transversely through the tongue 15 near its rearmost end, as shown in FIGURES 4 and 5.

The frame 10 is capable of being extended longitudinally at the rear thereof through the medium of an extensible frame bar 54 which has a leg 55 welded to each end and telescopically extended into hollow side members 11 and 12 of the frame 10, as shown in FIGURE 11. Each of the legs 55 has a series of spaced apertures 56 therein adapted to receive bolts or pins 57 arranged through the side members 11 and 12 which secure the bar 54 in extended position, as indicated in dotted lines in FIGURE 2.

Figure 9:
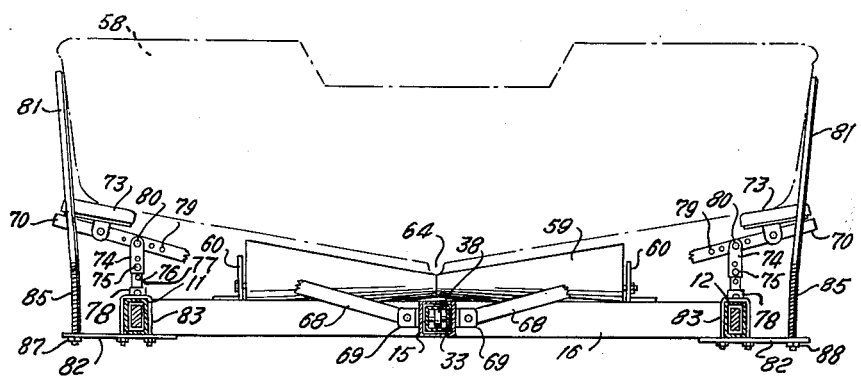
FIGURE 9 is a transverse sectional view of the trailer frame, on lines 9—9 of FIGURE 3, showing the rear cross bar, the adjustable boat supporting arms and the flexible guide rods.

To facilitate launching and loading a boat 58 from or onto the trailer a roller 59 is mounted longitudinally of and on the top of the bar 54, having its ends pivoted in brackets 60 welded to the latter. The roller 59 is tapered from both ends toward the center to conform more readily to the bottom contour of the boat 58, as seen in FIGURES 8 and 9. The roller 59 is moved rearwardly when the frame bar 54 is extended, as shown in dotted lines in FIGURE 2.

As the boat 58 is moved onto the frame 10 by the cable 61 and the windlass 62, the latter being attached to the top of a stanchion 63 on the forward end of the tongue 15, the keel 64 thereof is supported on spools 65 spaced along the tongue 15, in the manner shown in FIGURES 1, 2, 3 and 8. A V-shaped keeper member 66 is attached to the top of the stanchion 63 and is engaged by the bow 67 of the boat 58 to stabilize the same in transit.

A plurality of pairs of adjustable supporting arms 68 are spaced longitudinally of the frame 10 and each pair is pivotally attached at their inner ends to brackets 69 secured to the sides of the tongue 15, as shown in FIGURES 1, 2, 3, 4, 8 and 9. The arms 68 are extensible, being of hollow material and rectangular in transverse section, each has an extension member 70 telescopically associated therewith and having a series of apertures 71 through which a pin 72 can be inserted to adjustably secure the same in extended position with respect to the arms 68. A pad 73 is pivotally attached to the outer end of each of the extension members 70 upon which the bottom of the boat 58 rests, as shown in FIGURES 1, 2, 3, 8 and 9.

In order that the extension members 70 may be adjustably supported by clevises 74 the latter are attached by pins 75 inserted through apertures 76 in links 77 and pivotally attached at their lower ends to brackets 78. The brackets are then secured to the top of the side members 11 and 12 of the frame 10. A series of apertures 79 are provided along the members 70 by which these elements are attached by pins 80 to the clevises 74.

Attached to the side members 11 and 12 of the frame 10, at spaced intervals, are pairs of flexible guide rods 81 whose lowermost ends are secured to the outer ends of straps 82 secured in horizontal planes by U-bolts 83 to the frame members 11 and 12, as best shown in FIGURES 8 and 9. Each of the straps 82 has a series of apertures 84 therein through which the legs of the U-bolts 83 can be arranged whereby longitudinal adjustments of the straps 82 can be accomplished to adjust the relationship of the rods 81 to the frame members 11 and 12 to accommodate boats of different widths.

Figure 10:
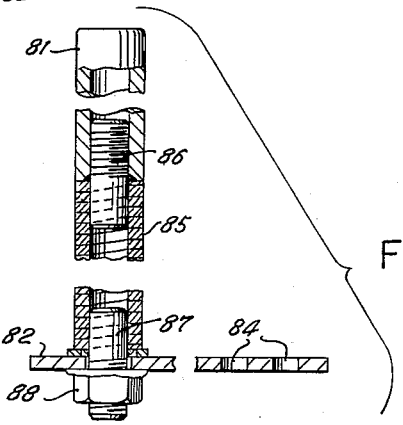
FIGURE 10 is a view, partially cut away and in section, showing the structure of the flexible guide rods and their supporting brackets, and FIGURE 11 fragmentarily illustrates, in partial section, the rear extensible portion of the frame.

The rods 81 are made flexible by providing coil springs 85 connected by threaded studs 86 to their lowermost ends, as shown in detail in FIGURE 10, and to the straps 82 by studs 87 extending through the outer ends thereof and secured by nuts 8. It is desirable that the rods 81 be yieldable to the variations in contours of the sides of boats transported on the trailer, as demonstrated in FIGURES 8 and 9. The rods 81 can be spaced as desired, both laterally and longitudinally of the frame 10.

The wheels 27 may be provided with fenders 89, if desired, which are preferably attached by suitable brackets (not shown) to the axle members 25 and 26 so that these elements can be moved with the wheels 27 when the axle is extended.

It is apparent that the structure above described is of such character as to be readily assembled by the purchaser, if desired, affording a simple but sturdy construction which may be compactly packaged for shipping thus minimizing storage space and transportation costs.

It is not intended that the invention be limited to the specific structure herein described since it is possible to modify the same in various ways without departing from the spirit and intent of the invention or the scope of the appended claims.

What is claimed is:

1. In a boat trailer having a frame comprising a pair of spaced parallel members and having an axle and wheels, a hollow tongue member, rectangular in transverse section, arranged intermediate the said parallel frame members and extending beyond the forward ends thereof, an extensible member, rectangular in transverse section, telescopically associated with said tongue member and coextensive therewith, a plurality of discular rollers pivotally spaced in alternate vertical and horizontal axial planes in the inner end of said extensible member and bearing against the inner walls of said tongue member, a plurality of pairs of cylindrical rollers pivotally arranged on the forward end of said tongue member, one pair of said rollers having its axes in a plane transverse to that of the other pair, the said rollers engaging opposing surfaces of said extensible member, and means in said tongue member and extensible member limiting the telescopic movement of said extensible member.

2. In a boat trailer having a wheeled frame, a tongue member, rectangular in transverse section, arranged longitudinally of said frame and intermediate the sides thereof, a rectangular extensible member telescopically arranged in said tongue member and adapted to be moved longitudinally thereof, a set of discular rollers pivoted in the inner end of said extensible member and having their axes in alternate horizontal and vertical planes, the said rollers being adapted to engage the inner walls of said tongue member, a plurality of pairs of cylindrical rollers pivotally arranged on the outer end of said tongue member engageable with the opposing surfaces of said extensible member in cooperation with said discular rollers, and means on said tongue member and said extensible member for limiting the longitudinal movement of said extensible member with respect to said tongue member.

3. In a boat trailer having a wheeled frame and a tongue member, rectangular in transverse section, arranged longitudinally of said frame intermediate the sides thereof, an extensible member, rectangular in transverse section, telescopically conformable to said tongue member and spaced concentrically from the inner walls thereof, rollers pivotally mounted in the inner end of said extensible member and having their axes in alternate longitudinal and horizontal planes, the said rollers engaging the inner walls of said tongue member, paired sets of rollers pivotally secured to the outer end of said tongue member, one pair of said rollers being pivoted in vertical planes and bearing against each side of said extensible member, and the opposite pair of said rollers being in horizontal planes and bearing against the top and bottom of said tongue member, and means on said tongue member and said extensible member for limiting the telescopic movement of said extensible member with respect to said tongue member.

References Cited in the file of this patent

UNITED STATES PATENTS

| | | |
|---|---|---|
| 2,361,951 | Livermon | Nov. 7, 1944 |
| 2,594,540 | Cole et al. | Apr. 29, 1952 |
| 2,636,745 | Cartwright | Apr. 28, 1953 |
| 2,770,470 | Halverson | Nov. 13, 1956 |
| 2,776,761 | Lovelace | Jan. 8, 1957 |
| 2,793,774 | Lovegreen | May 28, 1957 |
| 2,911,229 | Strehlow | Nov. 3, 1959 |

FOREIGN PATENTS

| | | |
|---|---|---|
| 723,732 | Great Britain | Feb. 9, 1955 |